E. W. DAVIS.
MOVING PICTURE CAMERA.
APPLICATION FILED APR. 23, 1919.

1,372,675.

Patented Mar. 29, 1921.

WITNESSES:
Mason H. Jones
H. W. Reynolds

INVENTOR:
Ernest W. Davis

E. W. DAVIS.
MOVING PICTURE CAMERA.
APPLICATION FILED APR. 23, 1919.

1,372,675.

Patented Mar. 29, 1921.
2 SHEETS—SHEET 2.

WITNESSES:
Mason H. Jones
H W Reynolds

INVENTOR:
Ernest W. Davis

UNITED STATES PATENT OFFICE.

ERNEST W. DAVIS, OF OAK PARK, ILLINOIS, ASSIGNOR TO BURKE & JAMES, INC., OF CHICAGO, ILLINOIS, A CORPORATION OF DELAWARE.

MOVING-PICTURE CAMERA.

1,372,675.      Specification of Letters Patent.     Patented Mar. 29, 1921.

Application filed April 23, 1919. Serial No. 292,035.

*To all whom it may concern:*

Be it known that I, ERNEST W. DAVIS, a citizen of the United States, residing in Oak Park, in the county of Cook and the State of Illinois, have invented certain new and useful Improvements in Moving-Picture Cameras, of which the following is a description.

My invention relates to moving picture cameras and embodies a novel construction of the magazine, which is so designed that the film does not leave it during the photographic operation. In prior devices of this class, it has been customary to draw the film outside of the magazine, where it is intermittently moved across an aperture in the camera and then carried back to either the same magazine or to another magazine, in which it is rewound. The slots through which the film enters and leaves the magazine are usually provided with velvet pressure pads, which press against the films, for the purpose of excluding the light while the magazine is outside of the camera. The objections to the above construction are excessive friction of the pads, resulting in buckling of the film, scratching of the film, and the generation of static electricity.

The object of this invention is to eliminate all of these defects and also to produce a camera in which the operation of threading will be unnecessary. This object is accomplished by providing a magazine having an aperture therein, through which the photographic exposure is made. The film does not leave the magazine but is intermittently moved across the aperture by means of the usual reciprocating pins, which engage the film through slots in the magazine. A specific embodiment of my invention is shown in the accompanying drawings in which—

Figure 6:
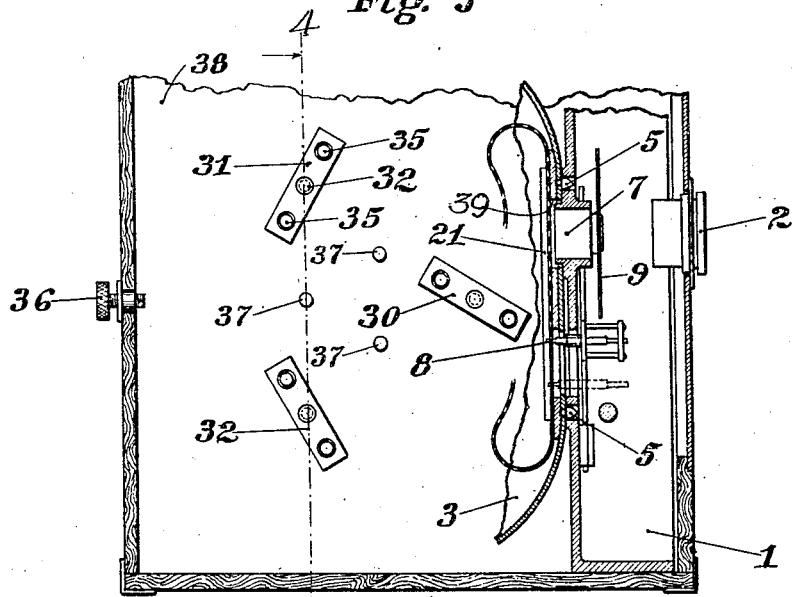
Fig. 6 is a section through the line 6, 6, in Fig. 2 and shows the magazine aperture and associated parts.

This invention comprises a camera 1, having a lens 2, adapted to produce a photographic image. The magazine 3, is arranged to be contained within the camera 1, and held there in such position that the image from the lens 2, is projected into the aperture 39, of the magazine. The necessary precision in locating the magazine in the camera is obtained by the dowels 5, 5, which are spaced to enter the corresponding holes in the camera frame, as shown in Fig. 6. The magazine is held in its forward position by means of the knurled screw 36.

The camera is also provided with an aperture 7, in line with the lens 2, so that the projected image passes through both camera and magazine apertures. The camera aperture 7, is somewhat smaller than the magazine aperture 39, whereby the size and location of the picture is determined by the camera aperture 7, and not by the magazine aperture 39. The camera is provided with the usual reciprocating pins 8, which intermittently advance the film. The mechanism for moving the pins 8. is purposely omitted in the drawing, in order to avoid confusion. Those skilled in the art will readily understand that any of the well known movements could be employed for this purpose.

The shutter 9, is arranged to obstruct the light at regular intervals in the usual manner. The magazine 3, is provided with a tight fitting cover 10, which is held on the magazine by means of sliding rods 11, which are operated by turning the knurled knob 12, thereby causing the rods 11, to move into the depression 13 in the magazine 3.

The magazine is provided with a feed roll spindle 14, and a takeup roll spindle 15, which revolve in the bearings 16, and 17. The magazine has slots 18, through which the reciprocating pins 8, may engage the film. The magazine also contains a sprocket 19 with idler rollers 20, 20.

Figure 1:
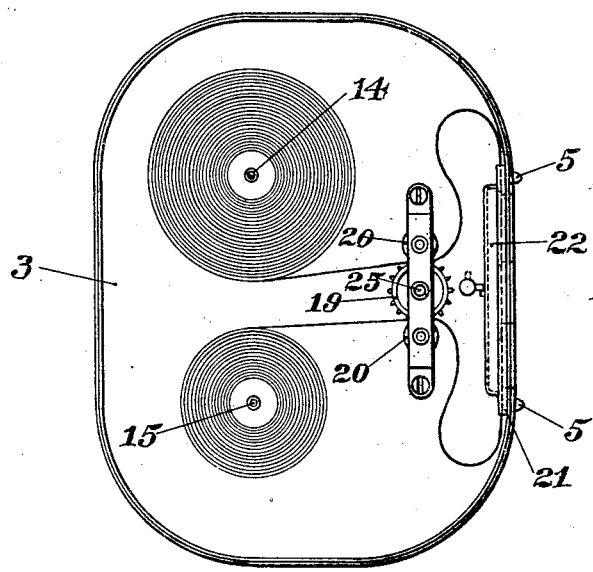
Figure 1 is a side elevation of the magazine with the cover removed.
Figure 2:
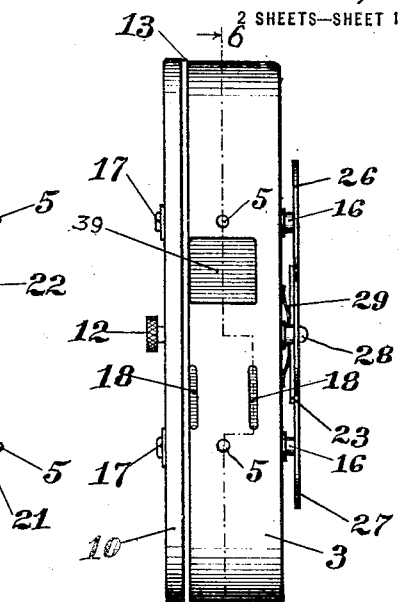
Fig. 2 is a front elevation, showing the aperture through which the picture is taken and the slots through which the film is advanced.
Figure 3:
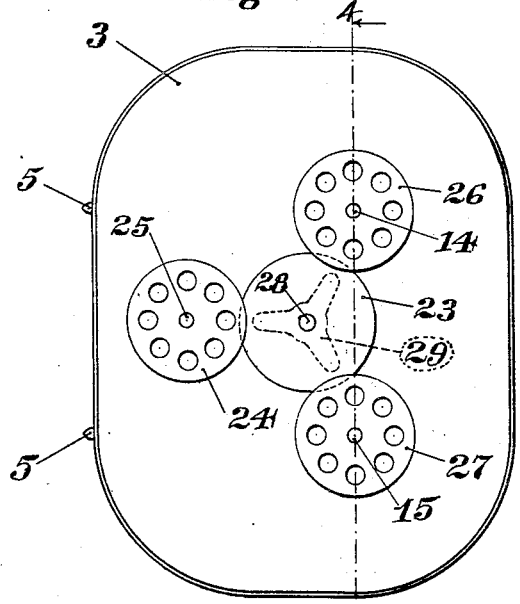
Fig. 3 is an elevation from the side opposite to that shown in Fig. 1.

The film channel 21, is arranged to guide the film across the aperture 39, and is covered with a film gate 22, which locally confines the light entering the aperture 39, and slots 18. The magazine is threaded up in the dark room, as shown in Fig. 1 and when the cover is applied, it is then ready to load into the camera in day light.

In order to prevent radial displacement of the sprocket 19, after the magazine has been threaded and before insertion in the camera, a friction disk 23 is provided, which engages with a driving disk 24 attached to the sprocket shaft 25. This tends to hold the sprocket 19, so that it can not turn and thus prevents losing the loops in the film. The friction disk 23 also engages similar driving disks 26, and 27, which are secured to the feed roll spindle 14, and takeup roll spindle 15 respectively. The friction disk 23 is held on the magazine by means of a pin 28, and is forced outwardly against the three driving disks 24, 26, and 27, by means of a spring 29.

Figure 4:
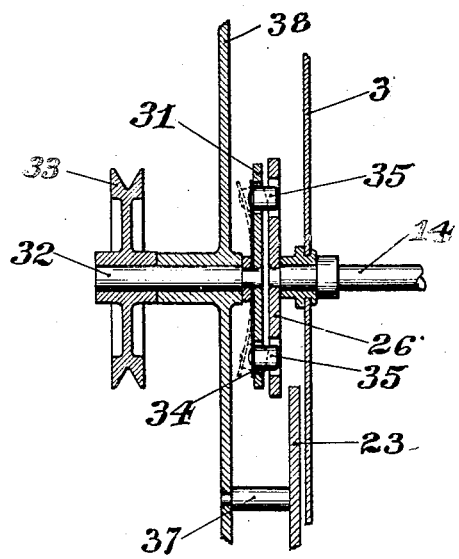
Fig. 4 is a section through the line 4, 4, in Fig. 3 and shows the clutch mechanism for driving the magazine spindle.

Referring to Fig. 4, it will be noticed that the friction disk 23, does not touch the drive disk 26 when the magazine is in position in the camera. This is because the friction disk 23, is pushed away from the drive disk 26, by the studs 37, of which there are three, as shown in Fig. 6. The disengagement of the friction disk 23, permits easy movement of the spindle 14, while the magazine is in the camera.

When the magazine is in operating position in the camera, the driving disks 24, 26, and 27 engage with the driving bars 30, 31, and 32, respectively. A sectional view of the driving bar 31, with its associated driving disk 26, is shown in Fig. 4. The driving bar 31, is carried on a shaft 32, which is rotated by the pulley 33, of the camera mechanism.

A flat spring 34, is secured to the shaft 32, and is provided with studs 35, 35, which engage perforations in the driving disk 26. If the perforations in the driving disk 26, do not register with the studs 35, 35, when the magazine is inserted in the camera, then the studs 35, 35, and spring 34, will be displaced, as shown by the dotted lines in Fig. 4. When this occurs, a slight radial movement of the shaft 32, is sufficient to make the studs register with the perforations in the driving disk 26. The studs will then snap into position, as shown by the full lines in Fig. 4.

The camera aperture 7, is smaller than the magazine aperture 39, and will therefore determine the framing of the picture. For this reason any slight variation in dimensions or location of the magazine aperture 39 will not affect the framing in the finished picture.

Figure 5:
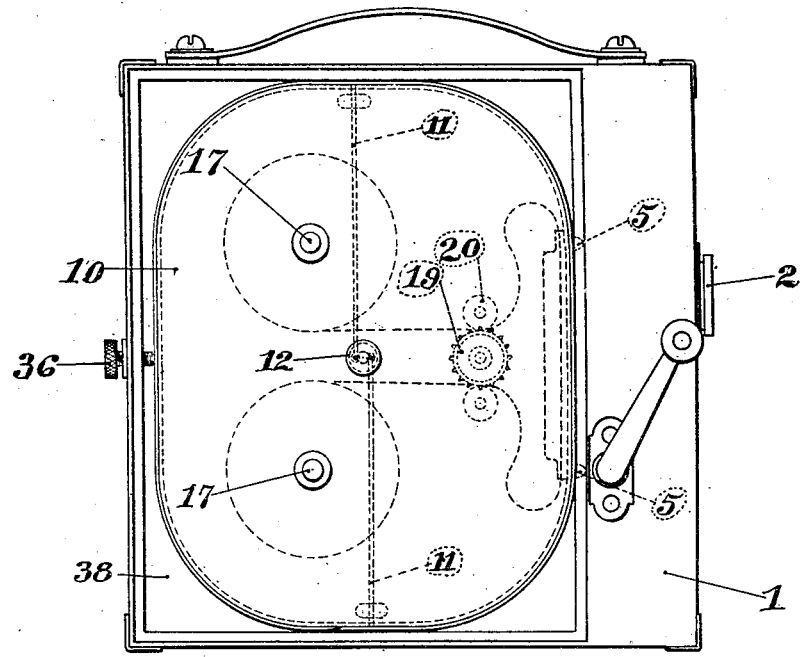
Fig. 5 is a side elevation of the camera with the magazine in operating position.

In operation, the magazine 3, is threaded in the dark room, as shown in Fig. 1, and it is then ready to load in the camera 1, as shown in Fig. 5. No threading is necessary in the loading operation, as this has been done in the dark room. Magazines may thus be interchanged more rapidly than is possible in any of the prior instruments of this class.

I claim:

1. The combination with a camera having a lens adapted to produce an image, of a light tight magazine having an aperture therein, means for holding said magazine in said camera in such manner that the image from said lens is projected through said aperture, a feed roller in said magazine, a take up roller in said magazine, means within said magazine for carrying film from said feed roller across said aperture and onto said take up roller, a holding means arranged to prevent rotation of said take up roller, and means within said camera for disengaging said holding means when said magazine is inserted in said camera.

2. The combination with a moving picture camera having moving parts therein and having a lens adapted to produce an image, of a light tight magazine having an aperture therein, means for holding said magazine in said camera in such manner that the image from said lens is projected through said aperture, a feed roller within said magazine, a take up roller within said magazine, a sprocket within said magazine, means operated by said moving parts for actuating said sprocket and said rollers, a holding means arranged to prevent rotation of said sprocket, and means within said camera for disengaging said holding means when said magazine is placed in said camera.

3. The combination with a moving picture camera having moving parts therein and having a lens adapted to produce an image, of a light tight magazine having an aperture therein, means for holding said magazine in said camera in such manner that the image from said lens is projected through said aperture, a feed roller within said magazine, a take up roller within said magazine, a sprocket within said magazine, means operated by said moving parts for actuating said sprocket and said rollers, a single holding means arranged to prevent rotation of both said rollers and said sprocket, and means within said camera for disengaging said holding means when said magazine is placed in said camera.

In testimony whereof I have affixed my signature in the presence of two witnesses.

ERNEST W. DAVIS.

Witnesses:
J. C. BLACKMORE,
W. EDSON.